United States Patent
Deralas

[19]
[11] Patent Number: 6,163,997
[45] Date of Patent: Dec. 26, 2000

[54] VEHICLE-MOUNTABLE PICTURE FRAME

[76] Inventor: Peter Deralas, 13800 Park Center La., Tustin, Calif. 92782

[21] Appl. No.: 09/348,099

[22] Filed: Jul. 6, 1999

[51] Int. Cl.[7] ..................................................... A47G 1/16
[52] U.S. Cl. .................................. 40/745; 40/593; 40/651
[58] Field of Search ............................ 40/745, 593, 760, 40/765, 776, 651, 666, 597, 1.5

[56] References Cited

U.S. PATENT DOCUMENTS

| | | | |
|---|---|---|---|
| 2,182,275 | 12/1939 | Blonkvist | 40/593 X |
| 2,887,804 | 5/1959 | Wise | 40/593 X |
| 3,313,053 | 4/1967 | Vogeli, Sr. | 40/593 X |
| 3,531,880 | 10/1970 | Ramee | 40/593 X |
| 3,533,178 | 10/1970 | Strohmaier | 40/593 X |
| 3,771,246 | 11/1973 | Ebner . | |
| 4,388,770 | 6/1983 | Manor . | |
| 4,391,053 | 7/1983 | Anthony . | |
| 5,124,845 | 6/1992 | Shimojo . | |
| 5,133,141 | 7/1992 | Bane . | |
| 5,241,768 | 9/1993 | Thompson | 40/593 X |
| 5,598,653 | 2/1997 | Schaefer . | |
| 5,647,099 | 7/1997 | Cohen . | |
| 5,960,572 | 10/1999 | DeVito | 40/593 |
| 6,029,384 | 2/2000 | McLaughlin | 40/593 X |

*Primary Examiner*—Terry Lee Melius
*Assistant Examiner*—William L. Miller
*Attorney, Agent, or Firm*—Steins & Associates

[57] ABSTRACT

A Vehicle-Mountable Picture Frame is disclosed. Also disclosed is a frame that includes a front side and a back side and a pocket formed therebetween, and having an aperture at the top for inserting photographs therethrough. The frame further includes one or more display portions disposed on the front side for displaying indicia there. The frame further includes a variety of attachment mechanisms that are connected to the backside of the frame via a swiveling attachment. The attachment mechanisms are configured to attach to a variety of surfaces within a vehicle, and further to permit the interchangeability of the attachment mechanisms with a variety of other types of mechanisms. The frame further is available in a variety of shapes and sizes to provide a package that is pleasing to the user's eye.

11 Claims, 5 Drawing Sheets

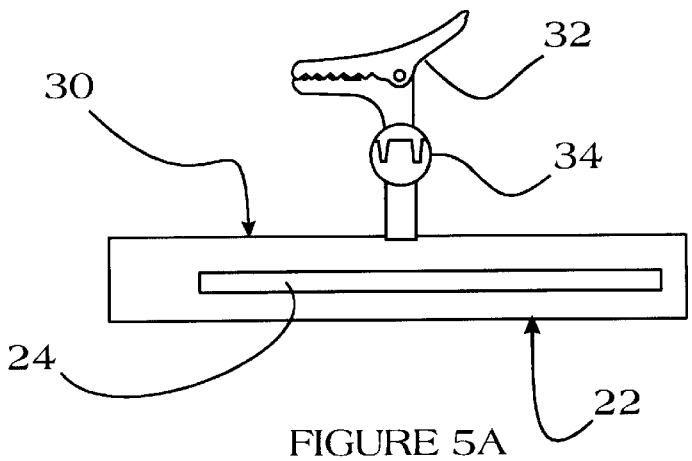
FIGURE 5A
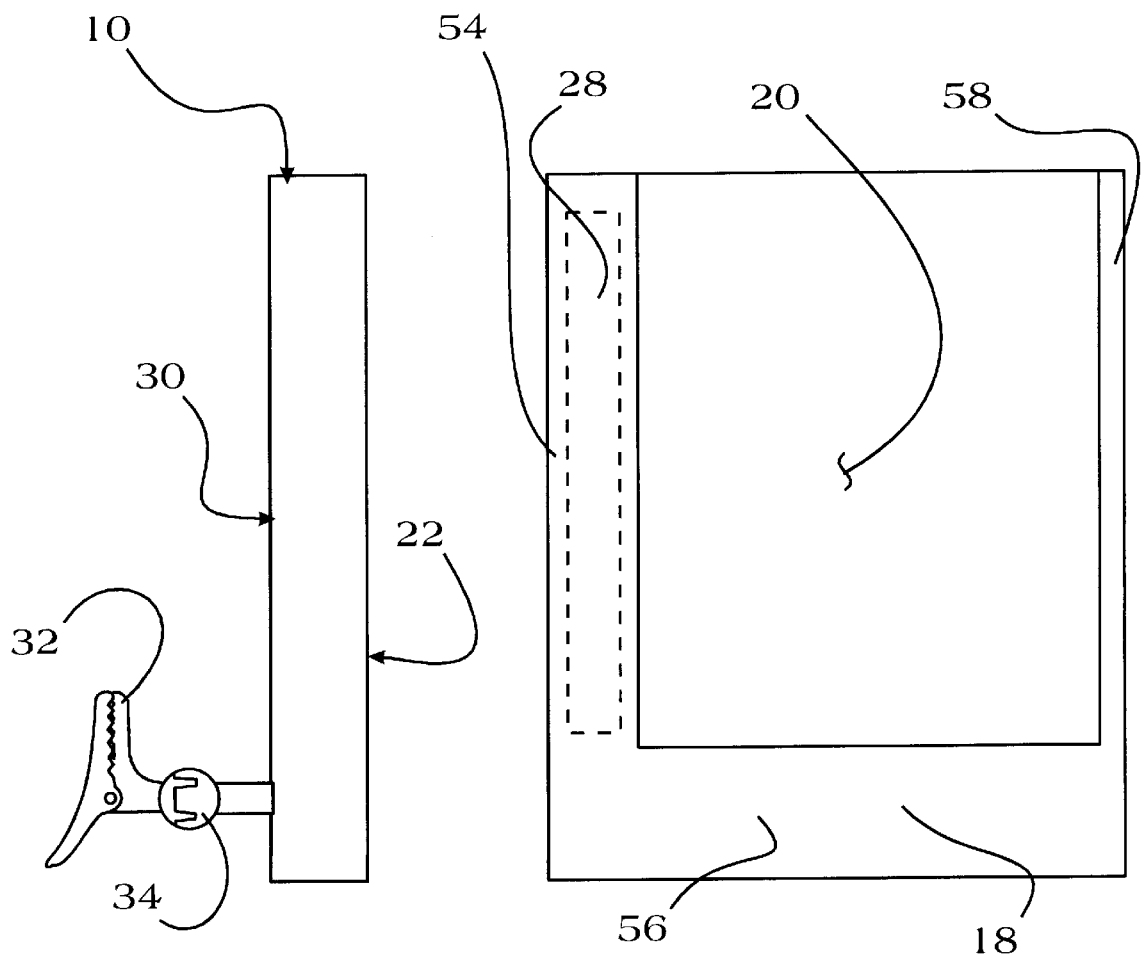
FIGURE 5C
FIGURE 5B

VEHICLE-MOUNTABLE PICTURE FRAME

BACKGROUND OF THE INVENTION

1. Field of the Invention

This invention relates generally to display apparatus and, more specifically, to a Vehicle-Mountable Picture Frame.

2. Description of Related Art

People love pictures. Virtually every home in the world has displayed within it, at least one picture, usually held within a picture frame. Most homes, in fact, have tens of pictures displayed in picture frames. Furthermore, many workplaces and offices have pictures displayed there and further, many people carry photographs with them in their wallet and/or purse. One particular place that is absent of pictures is the vehicle. It seems astounding that the typical working person spends an hour or two per day in their vehicle going to and from work, or even in the course of their work, however, the closest that the photographs of their loved ones are is in the seat of their pants in a wallet. What is needed is a picture frame for a vehicle.

Other inventors have recognized the desire for portable picture frames. Cohen, U.S. Pat. No. 5,647,099 for a "Garment Pin" discloses a portable picture frame for a person's garment. The Cohen device goes further to include a rest for a person's eyeglasses. The problem with the Cohen device is that while it demonstrates the desire for taking photographs with you, it ignores the ability to station those photographs within a vehicle; the Cohen device is simply attachable through a pin to a person's garment. Another inventor, Manor, U.S. Pat. No. 4,388,770 disclosed an "Identification Badge." Like Cohen, the Manor device includes a transparent pouch within which photographs could be displayed, but clips rather than pins to the wearer. The problem with the Manor device, like the Cohen device, is that it is not attachable within the car. Furthermore the Manor device essentially describes a soft plastic pouch, or series of pouches that is aesthetically unsuitable for permanent or semi-permanent installation within the vehicle. Yet another patent Anthony, U.S. Pat. No. 4,391,053 for a "Visor Picture Frame," sought to bring the pictures of a person's loved ones to a vehicle. The Anthony device includes an integral clip that is formed to attach to a sun visor or to a detachable stand for resting on a table. The problem with the Anthony frame is that when it is attached to the sun visor, the pictures displayed therein are hard to see for the driver and passengers. What is needed is a picture frame that attaches to the dashboard of the vehicle and/or the window (or other structure at the front of the vehicle) so the occupants of the vehicle can see the pictures easily without having to pull down the sun visor or look up at the ceiling.

SUMMARY OF THE INVENTION

In light of the aforementioned problems associated with the prior devices, it is an object of the present invention to provide a Vehicle-Mountable Picture Frame. The preferred frame will include a front side and a back side and a pocket formed therebetween, and having an aperture at the top for inserting photographs therethrough. The preferred frame will further include one or more display portions disposed on the front side for displaying an indicia thereon. It is a further object that the frame include a variety of attachment means that are connected to the back side of the frame via a swiveling attachment. The attachment means should be configured to attach to a variety of surfaces within a vehicle and further permit the interchangeability of the attachment means with a variety of other types of mechanisms. It is a further object that the frame be available in a variety of shapes and sizes to provide a package that is pleasing to the users eye.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, of which:

FIGS. 5A through 5C are top, front and side views of the preferred embodiment of the picture frame of the present invention shown in FIGS. 1 through 4.

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide a Vehicle-Mountable Picture Frame.

Figure 1:
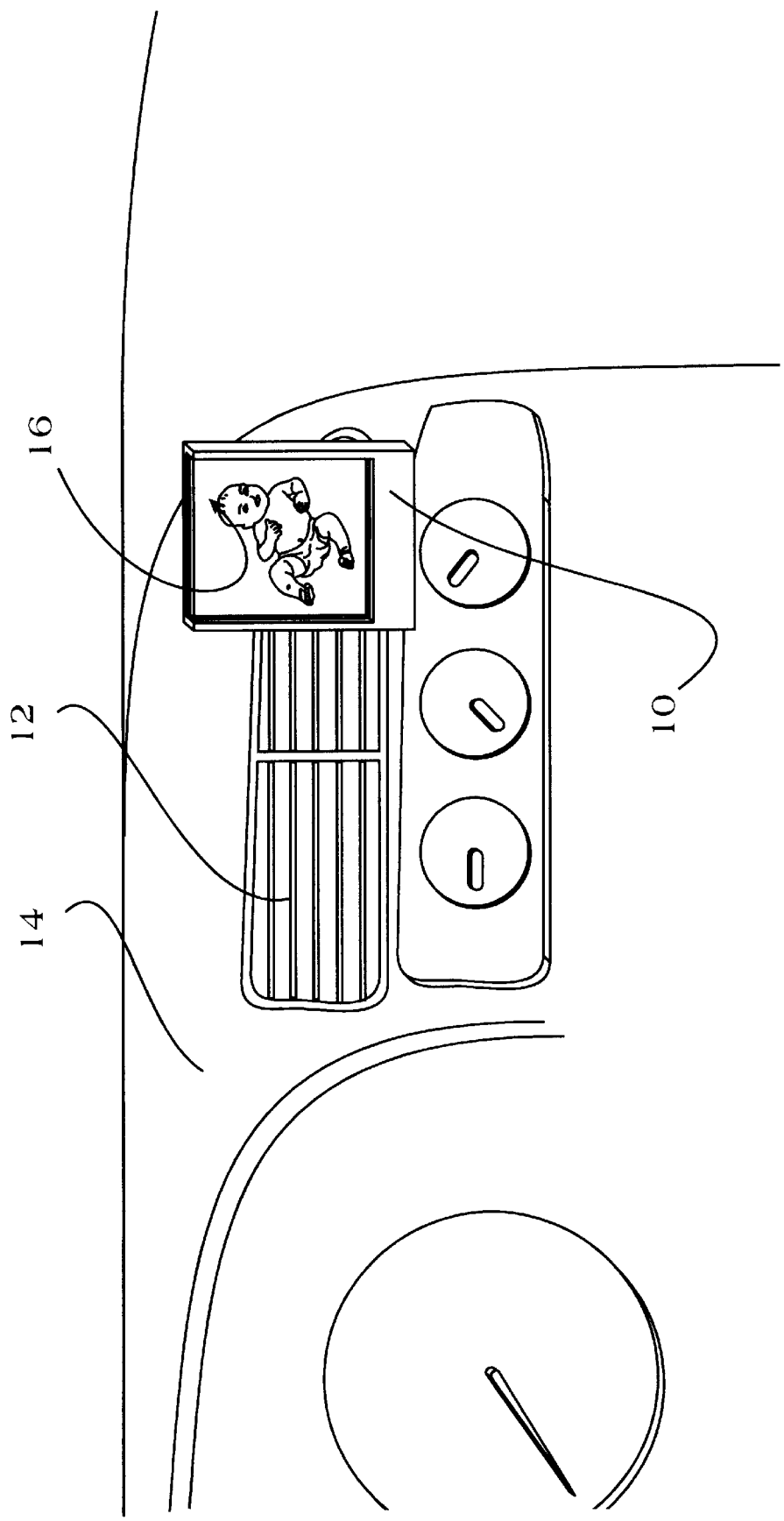
FIG. 1 is a perspective view of the preferred Vehicle-Mountable picture frame as it might be mounted to the dashboard of the vehicle.

The present invention can best be understood by a consideration of FIG. 1. FIG. 1 is a perspective view of the Vehicle-Mountable picture frame 10 of the present invention. As can be seen in FIG. 1, the frame 10 is attached to the vent 12 located on the face of the dashboard 14. It should be appreciated that once the frame 10 is attached to the vent 12, it will be in the close proximity to the driver, therefore being easily viewed. It should also be understood that the frame 10 might be attached to the top of the dashboard 14 itself, or even to the windshield (not shown), or in other locations within the vehicle. In any case, the frame 10 might further include a swiveling attachment such that the inclination or angle of the frame is adjustable in order to provide a variable and good view of the picture 16 that is located within the frame panel.

Figure 2:
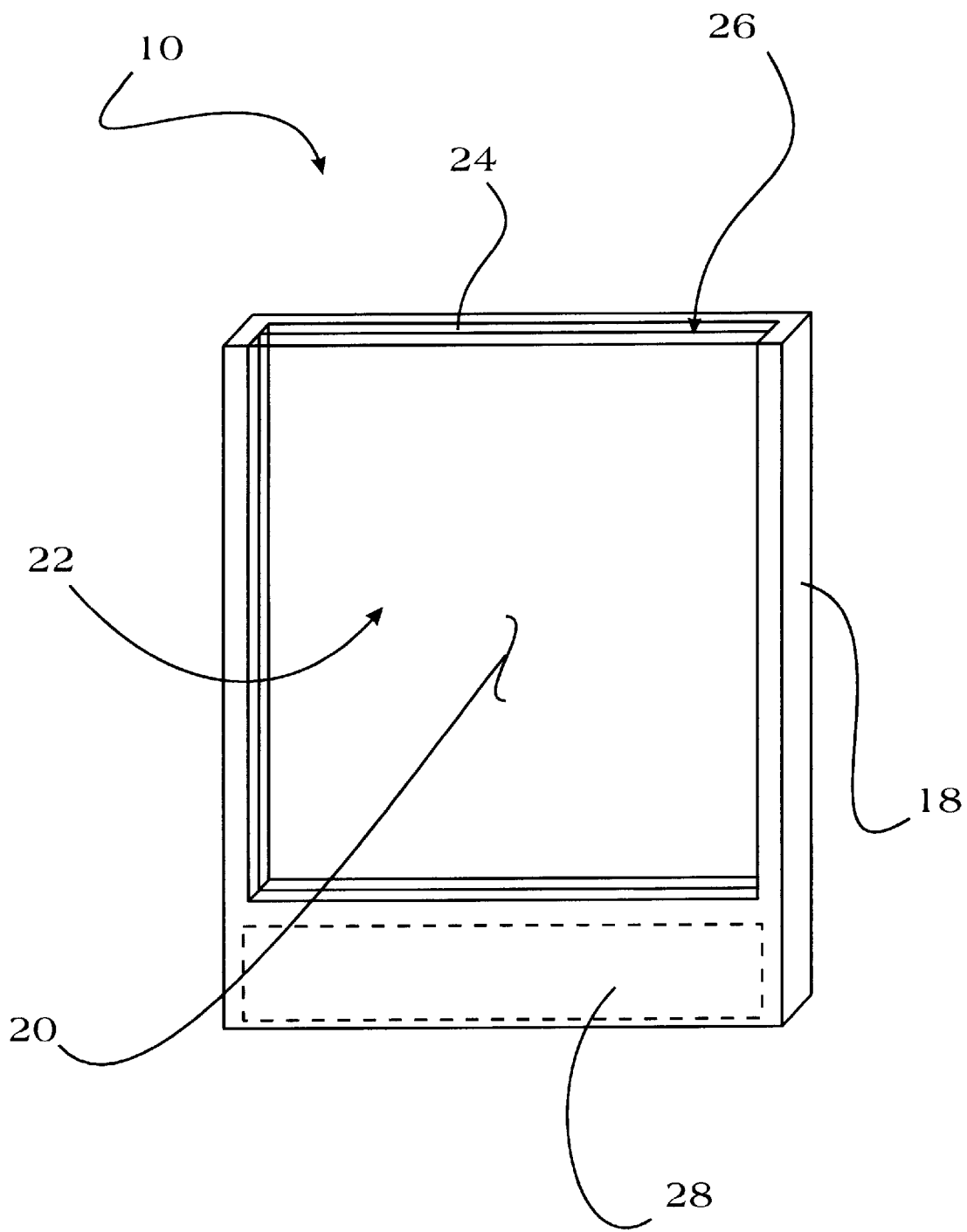
FIG. 2 is a perspective view of the picture frame of FIG. 1.

Now turning to FIG. 2, we can further explore the benefits of the present invention. FIG. 2 is a perspective view of the picture frame 10 of FIG. 1. In this embodiment, the frame 10 comprises a frame member 18 and a clear window member 20 facing the front side 22 of the frame 10. Located at the upper edge of the clear window member 20 is an aperture 24 through which photographs or other thin objects might be inserted into a suitably formed compartment 26 such that they might be viewed through the clear window member 20. It should be understood, that when the user desires to exchange photographs, he or she need merely invert the frame member 18, such that the photograph slips out of the compartment 26 through the aperture 24, after which the replacement photograph might be inserted. Also found on the frame member 18 is a display portion 28, in this case located on the bottom of the frame member 18. The display portion 28 is provided for the display of indicia, such as owner's name, manufacturers name, or perhaps even personal messages written thereon by the user. As such, the display portion 28 might include a flat surface for the inscribing of indicia permanently thereon, or it might also be something akin to a note-taking surface to provide a convenient location for the user to write with an erasable writing implement (not shown). It should clearly be understood that while the display portion 28 is located on the bottom of the frame 18 in this depiction, in other embodiments it might be alternatively located on one of the side portions of the frame member 18. The frame member 18 is preferably made from a lightweight durable material such as plastic or wood or metal, depending on the application involved, and the particular aesthetics desired. Furthermore, the clear window member 20 is preferably made from a clear plastic or other material to provide protection for the photographs found therebehind, while still providing a clear view of them. Furthermore, clear window member 20 might also include designs or patterns inscribed on its surface in order to provide a visual frame for the photograph and an even more pleasing result.

Figure 3:
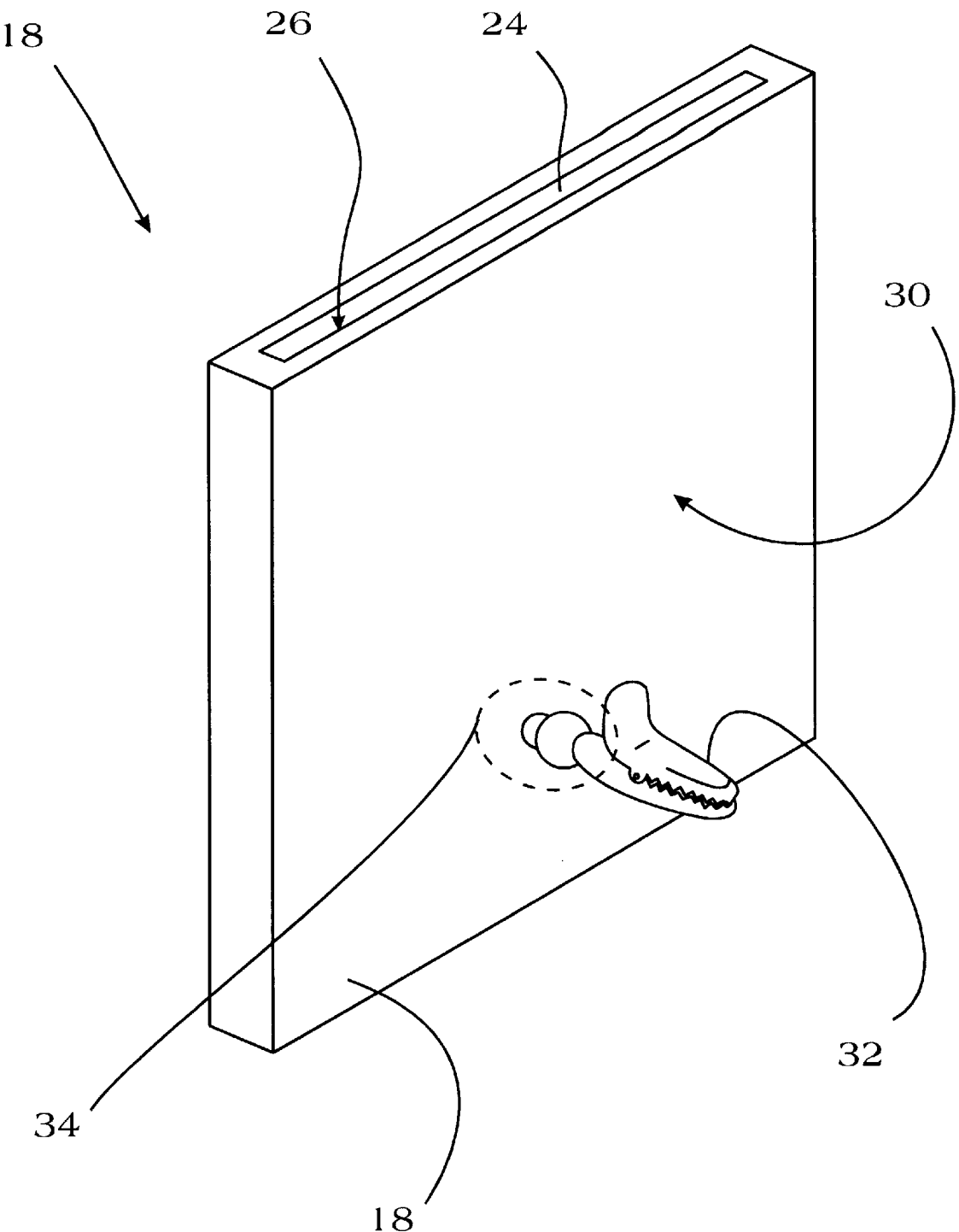
FIG. 3 is a perspective view of the back side of the picture frame of FIGS. 1 and 2.

We will now turn to FIG. 3 to examine the novel themes for attaching picture frame 10 to the present invention. FIG. 3 is a perspective view of the back side 30 of the picture frame 10 of FIGS. 1 and 2. As can be seen, on the back side 30 of the picture frame 10 is located attachment means 32 for attaching the frame 10 to the dashboard or 5 window of the vehicle. The attachment means 32 comprises a variety of different embodiments that will be more fully disclosed below in connection with FIG. 4. Furthermore, the attachment means 32 attaches to the backside 30 of the picture frame 10 via swivel means 34 for permitting the access of the attachment means 32 to swivel around a point, thereby providing the user with the ability to position the angle of the picture frame 10 to gain the best view thereof. In most cases, the back side 30 of the picture frame 10 will not be see-through, however, in some cases the user may wish to have viewing access to both sides of the contents of the compartment 26. In any case, the materials of construction will be as described above in connection with FIG. 2.

Figure 4:
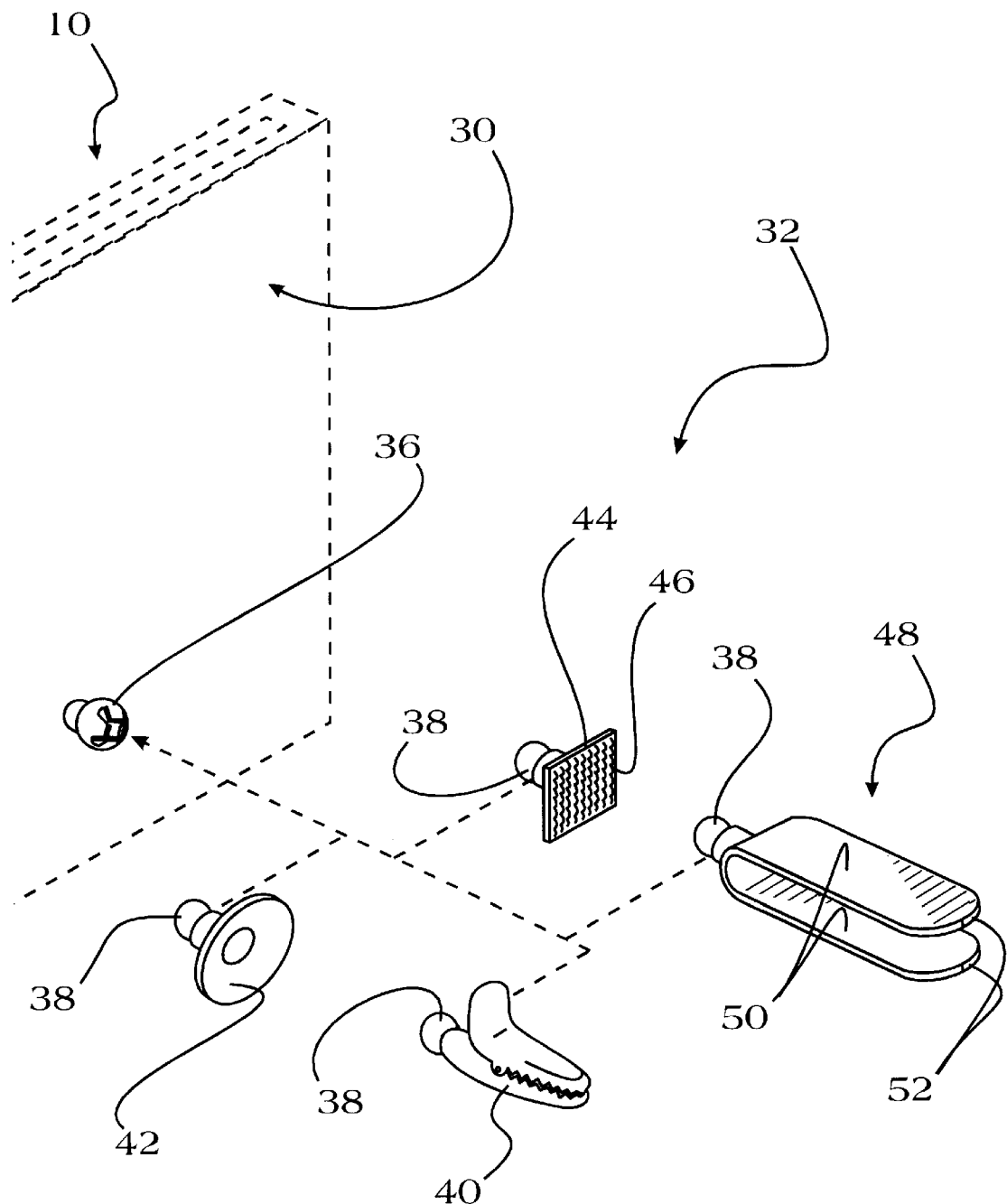
FIG. 4 is a perspective view of the back side of the picture frame of FIGS. 1 through 3 depicting an alternative detachable attachment means.

Now turning to FIG. 4, we can see further details of the present invention. FIG. 4 is a perspective view of the back side 30 of the picture frame 10 of FIGS. 1 through 3 depicting the alternative detachable attachment means. As can be seen in FIG. 4, a variety of attachment means 32 might be employed. In any case, the previously described swivel means 34 is herein comprised of a socket 36 attached to the back side 30 and into which a ball 38 is removably inserted. As can be seen, attached to the ball 38 might be a clip 40 (commonly known as an alligator-type clip), which will permit attachment of the frame 10 to a variety of surfaces including the visor or even portions of the dashboard. The ball 38 might also have a suction cup member 42 extending therefrom for attaching to smooth, relatively flat surfaces such as the windows and/or the windshield. Furthermore, the ball 38 might include a pad 44 having a hook-and-loop fastener 46 attached thereto so that the frame might be attached anywhere a cooperating section of the hook-and-loop fastener 46 is found. Finally, the ball 38 might have an alternate clip 48 extending therefrom. This alternate clip 48 is specifically configured to easily attach to a vent without marring its surface. In this case, the clip 48 comprises a pair of finger members 50, each terminating in a pair of outwardly curved tips 52. In order to attach the frame to the vent, therefore, the finger members 50 need simply be slipped between the louvers in the vent, after which the tips 52 will hold the alternate clip 48 in place. It should be understood that a variety of other attachment means might be necessary; what is critical is that the frame 10 include a socket 36 and ball 38 and some other means for attaching the frame to a surface within the user's vehicle. It should be also understood that while the socket 36 is attached to the frame 10 in this embodiment, that it is further possible for the ball 38 to be attached to the frame and therefore have the socket 36 be a part of the attachment means 32.

Finally, turning to FIGS. 5A and 5C, we can see that the frame member 18 comprises a first side surface 54, a bottom surface 56 and a second side surface 58. In some embodiments there might also be a top surface (not shown). FIGS. 5A through 5C are top, front and side views of the preferred embodiment of the picture frame 10 of the present invention shown in FIGS. 1 through 4. The clear window member 20 is located between the aforementioned frame members. Also shown here is a display portion 28 that is located on the first side surface 54 rather than on the bottom surface 56. It can be seen in FIG. 5C that the frame 10 has an extremely thin profile in order to retain its clean lines and lightweight composition. It should further be understood that while the embodiment shown in these figures is essentially rectangular, that a variety of different shapes are possible. For example, the frame 10 might be shaped as a circle, or a triangle or even as other complex shapes depending on the particular desires of the manufacturer and/or targeted audience. In any case, and for any shape, the frame 10 will be attachable to the inside surfaces of the user's vehicle.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A frame for pictures and other objects, comprising:
   a frame member defined by a front side, and a back side, and a compartment formed therebetween, said compartment accessible through an aperture, said front side further defined by at least one display portion formed thereon for the display of indicia;
   a window member inserted in said frame member front side, said window member separate from and substantially adjacent to said display portion; and
   attachment means for attaching to an interior surface of a vehicle, said attachment means extending from swivel means said swivel means extending from said frame member.

2. The frame of claim 1, wherein said swivel means comprises a socket extending from said back side and a ball rotatably retained within said socket, said ball attached to said at attachment means.

3. The frame of claim 2, wherein said attachment means comprises an alligator clip.

4. The frame of claim 2, wherein said attachment means comprises a suction cup.

5. The frame of claim 2, wherein said attachment means comprises a pair of elongate fingers, said fingers configured to slip between vent louvers.

6. The frame of claim 2, wherein said attachment means comprises a pad having an attachment surface, said attachment surface exposing an adhesive material.

7. The frame of claim 2, wherein said frame member defines a generally rectangular shape.

8. The frame of claim 2, wherein said frame member defines a generally circular shape.

9. The frame of claim 1, wherein said aperture is for inserting the thin objects therethrough for placement in said compartment.

10. A vehicle-mountable picture frame, comprising:

a frame member defined by a font side and a back side, said front side further defined by at least one display portion formed thereon for display of indicia;

a window member separate from said at least one display portion;

a chamber formed between said frame member and said window member;

an aperture for inserting thin objects therethrough for placement in said chamber;

swivel means for providing a member defining a swivelling axis extending distally from said back side of said frame member; and attachment means for attaching to an interior surface of a vehicle, said attachment means extending from said swivel means.

11. The frame of claim 10, wherein said swivel means comprises:

a socket extending from said frame member; and a ball extending from said attachment means, and cooperatively configured with said socket such that said ball removably inserts into said socket.

* * * * *